United States Patent [19]
Payne

[11] Patent Number: 5,639,331
[45] Date of Patent: Jun. 17, 1997

[54] METHOD FOR CONTINUOUSLY FORMING STRUCTURE FROM RESIN, PARTICLES, AND POROUS BLANKET

[76] Inventor: LeRoy Payne, 3300 Nicholas La., Molt, Mont. 59057

[21] Appl. No.: 581,970

[22] Filed: Jan. 2, 1996

Related U.S. Application Data

[60] Division of Ser. No. 239,540, May 9, 1994, Pat. No. 5,496,434, which is a continuation-in-part of Ser. No. 870,927, Apr. 20, 1992, Pat. No. 5,330,603, which is a continuation-in-part of Ser. No. 753,344, Aug. 30, 1991, Pat. No. 5,145,282, which is a continuation-in-part of Ser. No. 521,442, May 10, 1990, Pat. No. 5,049,006, which is a continuation-in-part of Ser. No. 417,501, Oct. 5, 1989, Pat. No. 4,955,760, which is a continuation-in-part of Ser. No. 235,205, Aug. 23, 1988, Pat. No. 4,872,784.

[51] Int. Cl.$^6$ .......................... B32B 31/06; B32B 31/08; B32B 31/12
[52] U.S. Cl. .......................... 156/242; 118/123; 118/126; 118/419; 156/276; 156/324; 427/138; 427/139; 427/186
[58] Field of Search .......................... 156/550, 547, 156/549, 538, 500, 276, 324, 578, 242; 118/126, 123, 688–690, 708, 419, 420; 427/186, 138, 139

[56] References Cited

U.S. PATENT DOCUMENTS

| | | | |
|---|---|---|---|
| 1,392,323 | 10/1921 | Goldberg | 427/186 X |
| 2,648,619 | 8/1953 | Alderfer | 118/123 |
| 4,417,939 | 11/1983 | McAdams | 156/547 X |
| 4,955,760 | 9/1990 | Payne | 156/550 X |

*Primary Examiner*—Jeff H. Aftergut
*Attorney, Agent, or Firm*—Arthur L. Urban

[57] ABSTRACT

A method of forming a continuous structure includes the steps of preselecting a liquid reactive resin forming material, a particulate solid additive material and a porous blanket. The additive particles are mixed with the liquid resin forming material substantially continuously in a proportion significantly greater than that of the liquid resin forming material. Substantially all of the additive particles are encapsulated with the liquid resin forming material to a preselected thickness. A pool of the resulting mixture is formed on the blanket. The blanket is advanced at a rate sufficient to create movement of the additive particles within the pool and maintain the additive particles in suspension. Part of the liquid resin forming material is migrated through the blanket substantially uniformly prior to gelling of the liquid resin forming material to form a continuous resin matrix within the blanket. Also, apparatus forming the structure as well as the structure itself.

13 Claims, 1 Drawing Sheet

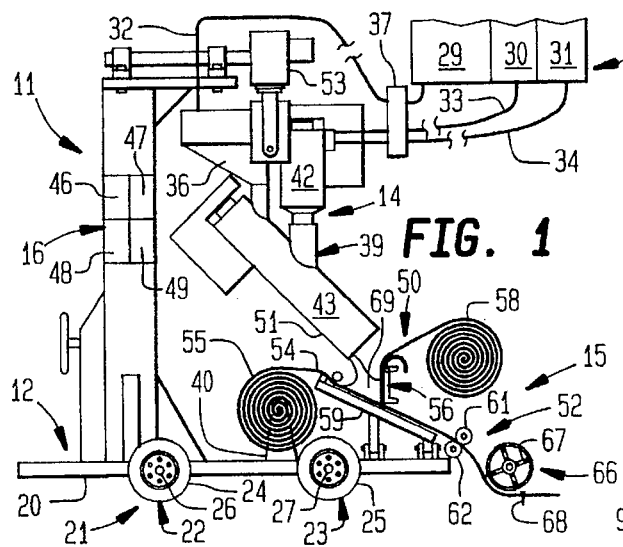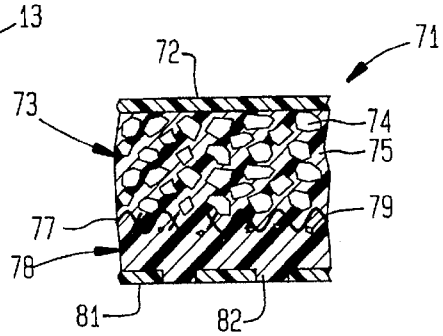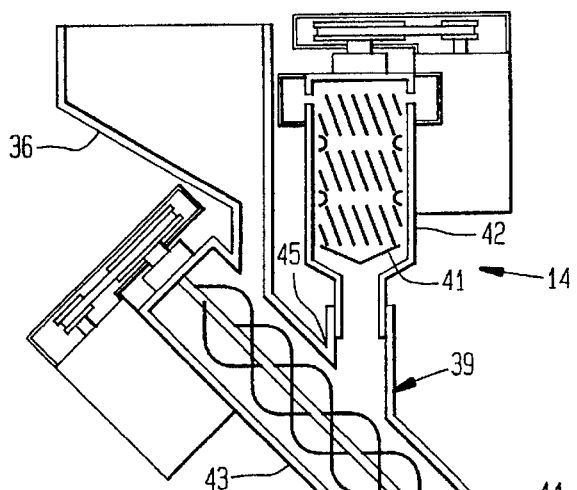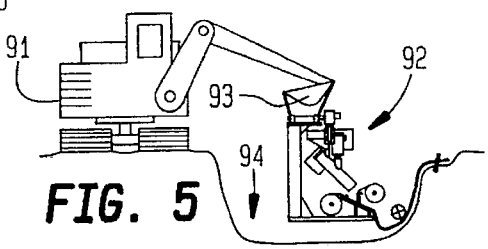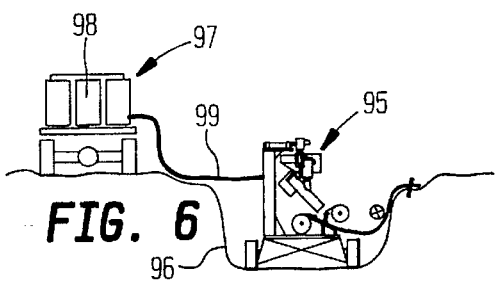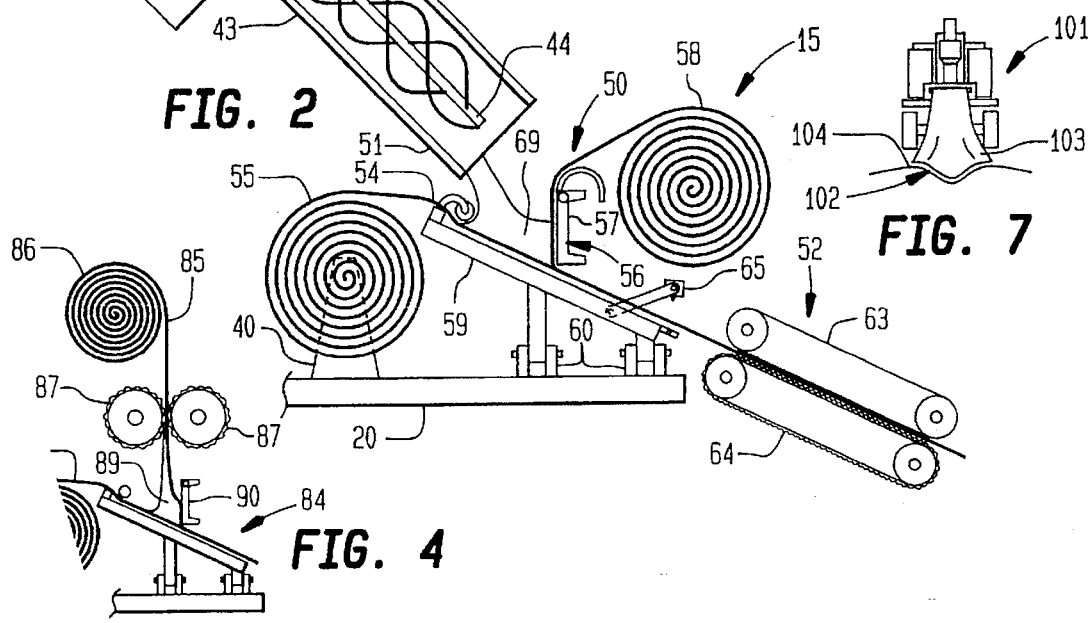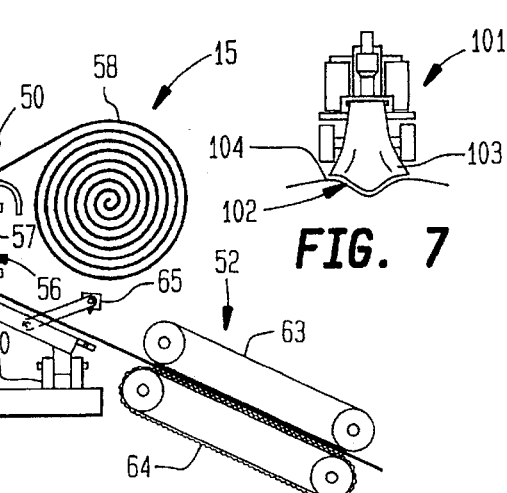

METHOD FOR CONTINUOUSLY FORMING STRUCTURE FROM RESIN, PARTICLES, AND POROUS BLANKET

This application is a division of application Ser. No. 08/239,540, filed May 9, 1994, now U.S. Pat. No. 5,496,434 which is a continuation-in-part of application Ser. No. 870,927, filed Apr. 20, 1992, now U.S. Pat. No. 5,330,603 which in turn is a continuation-in-part of application Ser. No. 753,344, filed Aug. 30, 1991, now U.S. Pat. No. 5,145,282, which in turn is a continuation-in-part of application Ser. No. 521,442, filed May 10, 1990, now U.S. Pat. No. 5,049,006, which in turn is a continuation-in-part of application Ser. No. 417,501, filed Oct. 5, 1989, now U.S. Pat. No. 4,955,760, which in turn is a continuation-in-part of application Ser. No. 235,205, filed Aug. 23, 1988, now U.S. Pat. No. 4,872,784.

This invention relates to a novel continuous structure forming method and apparatus and to a new continuous structure produced thereby.

The inventions of the applicant's early patents listed above provide novel methods and apparatus to produce at a job site structures such as liners and pipe for the collection, storage and/or distribution of water and other liquids. The apparatus employed, which normally is transported to a job site, is complex and sophisticated requiring major capital investment.

The invention of applicants' latest application listed above, Ser. No. 870,927, filed Apr. 20, 1992, now U.S. Pat. No. 5,330,603, provides a novel method and structure that can be produced with a minimum of machinery at the job site. Thus, the structure and method of the invention can be employed efficiently and economically for patching and for small jobs even at remote locations.

While the applicant's earlier patents mention the use of recycled or waste materials as additives in structures, most efforts of others have been directed to separating the waste into its primary components and the combining of similar materials into the same product again. Various governmental and private agencies have provided incentives such as subsidies and grants in attempting to develop commercially feasible products and procedures for recycling waste. To date, only very few waste materials are routinely recycled on an economical basis.

The present invention provides a novel method, apparatus and structure which overcome the shortcomings of previous expedients. In addition, the method, apparatus and structure provide features and advantages not found in earlier technology.

The structure produced with the method and apparatus of the invention can include major proportions of recycled, waste or other materials which are readily available at a job site. These structures are of high quality and may exhibit properties not usually found in products formed with conventional ingredients.

The method of the present invention may be conducted by individuals with only limited mechanical skills and experience. Structures can be produced by such individuals safely and efficiently without supervision. The configuration and composition of the structure can be changed easily.

The method of the invention can be modified to form a variety of different structures. Variations in physical dimensions, composition and surface appearance. etc. can be achieved. Even with such changes, uniform high quality can be maintained without difficulty.

A novel method of the present invention for forming a continuous structure includes the steps of preselecting a liquid reactive resin forming material, a particulate solid additive material and a porous blanket. The additive particles are mixed with the liquid resin forming material substantially continuously in a proportion significantly greater than that of the liquid resin forming material. Substantially all of the additive particles are encapsulated with the resin forming material to a preselected thickness.

A pool of the resulting mixture is formed on the porous blanket. The blanket is advanced at a rate sufficient to create movement of the additive particles within the pool and maintain the additive particles in suspension. Part of the liquid resin forming material is migrated through the blanket substantially uniformly prior to gelling of the liquid resin forming material to form a continuous resin matrix within the blanket.

The additive particles advantageously are mixed with the liquid resin forming material as it is passed continuously through an elongated mixing chamber. Preferably, the mixture is deposited on the blanket in a reciprocating motion across the width of the blanket. The pool of the mixture advantageously is confined on the blanket with an elongated barrier positioned close thereto and substantially transverse to the direction of blanket advance.

Preferably, pressure is applied to the blanket after it passes the barrier. The pressure advantageously is applied simultaneously across an entire width of the blanket. A preselected pattern may be formed on a surface of the blanket while pressure is applied thereto, preferably along an extended length of the blanket, such as by applying pressure for an extended period of time.

A plastic film may be disposed between the barrier and the mixture with the film advantageously moving past the barrier and preferably being of extended length and remaining in contact with a surface of the blanket. The film may be perforated to facilitate the removal of air and in some situations to permit liquid resin forming material to pass therethrough to adhere the structure to an adjacent surface if desired.

Benefits and advantages of the novel method, apparatus and structure of the present invention will be apparent from the following description of the accompanying drawings in which:

FIG. 1 is a side view of one form of mobile structure forming apparatus of the present invention;

FIG. 2 is an enlarged fragmentary side view partially in section of another form of structure forming apparatus of the invention;

FIG. 3 is an enlarged fragmentary cross sectional view of the structure of the invention shown in FIG. 1:

FIG. 4 is a fragmentary side view of other forms of raw material supplying and mixing portions of the apparatus of the invention;

FIG. 5 is a schematic illustration of a different form of mobile continuous structure forming apparatus of the invention;

FIG. 6 is a schematic illustration of a further form of structure forming apparatus of the invention; and FIG. 7 is a schematic illustration of another form of structure forming apparatus of the invention.

As shown in the drawings, one form of novel mobile continuous structure forming apparatus 11 of the present invention includes a supporting portion 12, a raw material supplying portion 13, a mixing portion 14, a matrix forming portion 15 and a control portion 16.

The supporting portion 12 of the structure forming apparatus 11 includes at least one base section 20. Carriage means 21 operatively associated with base section 20 includes at least one transverse axle assembly 22, and as shown in FIG. 1, two axle assemblies 22,23 with wheels 24,25 mounted on free ends 26,27 thereof.

The raw material supplying portion 13 of the apparatus 11 includes a plurality of reservoirs 29,30,31 operatively connected with the supporting portion 12. The reservoirs are connected independently with the mixing portion 14 through flexible conduit means 32,33,34. The raw material supplying portion advantageously also includes a gravity feed hopper 36 adjacent the mixing portion 14 and preferably heating means 37 along the length of the flexible conduit means 32–34.

The mixing portion 14 of the structure forming apparatus 11 of the invention includes a generally vertically oriented elongated mixing chamber 39 mounted on the base section 20 adjacent blanket support means 40. A first rotatable mixing element 41 is disposed within an upper section 42 of the mixing chamber as shown in FIG. 2.

The mixing chamber 39 also includes a lower section 43 which preferably is disposed at an obtuse angle to the upper section. A second open rotatable mixing element 44 is disposed within the lower section 43 of the mixing chamber 39.

Advantageously, the hopper 36 is connected to the lower section 43 of the mixing chamber 39 adjacent the intersection 45 of the lower section 43 with the upper section 42. The first and second rotatable mixing elements 41,44 respectively are centrally aligned within the upper and lower sections 42,43 of the mixing chamber 39.

The matrix forming portion 15 of the apparatus 11 includes mixture distributing means 50 adjacent an outlet 51 of the mixing chamber 39 and the blanket support means 40. Pressure applying means 52 is disposed subsequent to the mixture distributing means 50. Advantageously, the matrix forming portion 15 includes means 53 reciprocating the outlet 51 of the mixing chamber across the width of a blanket 54 from roll 55 passing thereunder.

The mixture distributing means 50 preferably also includes an elongated barrier member 56 disposed closely adjacent to the path of blanket 54 advancing through the apparatus and substantially perpendicular to the direction of blanket advance. Advantageously, the barrier member 56 as shown is an elongated blade member 57 inclined to the blanket in the direction of blanket advance. Plastic film dispensing means shown as film supply 58 preferably is disposed adjacent the barrier member 56.

The matrix forming portion 15 advantageously includes a shallow tray member 59 disposed below the outlet 51 of the mixing chamber 39 and below the path of the blanket 54 through the apparatus. Preferably, the tray member is disposed in a plane substantially parallel to a longitudinal plane through the lower section 43 of the mixing chamber. Advantageously, the tray member 39 is connected to base section 20 through pivot connectors 60 to simplify orientation of the tray.

The pressure applying means 52 preferably includes at least one roller shown in FIG. 1 as opposed rollers 61,62 disposed perpendicular to the path of the blanket 54 and extending beyond edges of the blanket. Roller 61 and/or 62 advantageously includes a patterned surface.

Alternatively, or in addition, the pressure applying means 52 may include a belt 63 extending along the path of the blanket and particularly cooperating belts 63,64 disposed above and below the blanket with one of the belts being a pattern forming belt. Most advantageously, cooperating belts 63,64 extending along the blanket are disposed in planes substantially parallel to tray member 59.

A cutter member 65 (FIG. 2) may be located along the path of the blanket 54. Also, one or more rotatable wheels 66 preferably are mounted on brackets (not shown) extending forwardly from the base section 20. These wheels are oriented to press edges of the structure against a supporting surface. Preferably, the wheels include hollow spoke members 67 which include pins or nails with mechanisms (not shown) that drive the pin through a structure edge and into the underlying supporting surface to fix the position of the structure.

To form a structure of the invention employing apparatus 11 as shown in FIG. 1, a liquid reactive resin forming material is advanced from a reservoir 30 through a conduit 33 into upper section 42 of mixing chamber 39. Simultaneously, other minor ingredients e.g. colors, catalysts, etc. from reservoir 31 advance through conduit 34 into upper section 42 and are mixed with the resin forming material advancing therethrough by first rotatable mixing element 41.

The resulting liquid mixture thereafter flows through the lower section 43 of the mixing chamber wherein a particulate solid additive material from hopper 36 flows into an upper end of the lower section 43. The additive particles join the liquid resin forming material advancing therealong and are mixed therewith by second open rotatable mixing element 44.

The additive particles are mixed with the liquid resin forming material substantially continuously in a proportion significantly greater than that of the resin forming material. During this mixing operation, substantially all of the additive particles are encapsulated with the liquid resin forming material to a preselected thickness.

The resulting mixture being delivered from outlet 51 of the mixing chamber 34 passes onto blanket 54 as it advances over tray member 59. With barrier member 56 closely adjacent to the blanket and disposed transversely across the width thereof (FIGS. 1 and 2), a pool 69 of the mixture collects behind the barrier member. The blanket is advanced at a rate sufficient to create movement of the additive particles within the pool to ensure complete encapsulation and also to maintain the particles in suspension so the mixture adhering to the blanket is homogeneous.

As the blanket advances under the barrier member, excess mixture is removed and a substantially uniform preselected thickness is retained on the blanket. Thereafter, part of the liquid resin forming material is allowed to migrate through the blanket to form a cross section as illustrated in FIG. 3 which will be described hereafter.

If it is desired to form a preselected patterned surface on the treated blanket combination, the blanket is passed into contact with a patterned roller 61 or belt 63 or a combination of rollers 61,62 or belts 63,64. Advantageously, a pattern is formed on the blanket surface by applying pressure to the blanket for an extended period of time. This may be accomplished by using cooperating belts 63,64 of considerable length.

To produce high quality structures of the invention, it is important that all of the steps be carefully coordinated by control portion 16. The control portion 16 of the structure forming apparatus 11 of the invention includes programmable memory means 46 and actuating means 47 responsive thereto in combination with coordinating means 48 to control the operation of pumps, valves and drives. Preferably, the coordinating means includes a process controller 49 that initiates changes in the flows of materials and speeds of drives to bring variations therein back to the rates specified in the programs present in the memory 46.

This coordination commonly is achieved through the transmission of information such as digital pulses from the monitors and/or sensors at the control components to the process controller 49. The operating information is compared with the preselected programming parameters stored in the memory 46. If differences are detected, instructions from the controller change the operation of the components to restore the various operations to the preselected processing specifications.

As shown in FIG. 3, a cross section of a typical structure of the invention 71 includes a continuous upper plastic film 72 and an upper layer 73 including a plurality of encapsulated solid particles 74 e.g. particles from grinding discarded tires, within a continuous resin matrix 75. The resin matrix extends downwardly through blanket 77 and forms a thinner resin rich lower layer 78 including a few very small solid particles 79 disposed primarily closely adjacent to the blanket. The structure shown also includes a lower plastic film 81 which for certain applications may include perforations or other spaced openings 82 through which resin 83 extends.

The inclusion of upper and/or lower plastic films may facilitate the installation of novel structures of the invention under adverse weather conditions or below water or other liquids. Also, the flowing of resin through film openings 82 can provide adhesion of the structure to a subsurface (not shown).

Another method for obtaining a suitable mixture for application to a blanket employs apparatus 84 of the invention as shown in FIG. 4. A preformed film 85 (formed as described in applicant's copending application Ser. No. 870,927, filed Apr. 20, 1992) has a first preselected pattern including a plurality of independent sections spaced from a second preselected pattern of independent sections. One of the patterns includes independent sections with solid additive particles and a second preselected pattern of independent sections including a liquid reactive resin forming material.

As shown in FIG. 4, a roll 86 of the above preformed film 85 is passed between crushing rollers 87 which intermix the solid additive particles into the liquid resin forming material. The resulting mixture is carried downwardly with the film into contact with a blanket 88 advancing thereunder. A pool 89 of the mixture is formed between the film and the blanket by the restraint of barrier member 90.

The blanket is advanced at a rate sufficient to create movement of the solid additive particles within the pool to ensure encapsulation thereof and maintain the additive particles in suspension. The blanket with the mixture and a film on the upper surface passes under barrier member 90 to form a uniform layer of preselected thickness and then is advanced along the apparatus in the manner described with regard to the apparatus of FIG. 1. The structure may be used in the same or different applications as desired with similar results.

FIG. 5 illustrates the use of continuous structure forming apparatus of the invention in combination with a power shovel. The apparatus 92 is suspended from a bucket 93 of a shovel 91 movable along a bank of a ditch 94. The apparatus lays continuous lengths of the structure of the invention across the ditch from one bank to the other in an overlapping relationship.

One end of each length of the structure is staked to the ditch bank and the structure delivered from the apparatus which is disposed closely to the ditch surface. This arrangement is especially useful under windy conditions.

FIG. 6 illustrates another arrangement for using a structure forming apparatus of the invention. In this arrangement, apparatus 95 is positioned in the bottom of a ditch 96. As the apparatus moves along the ditch bottom, the apparatus positions lengths of the structure transversely of the ditch. Raw materials are supplied to the apparatus from a vehicle 97 including raw material reservoirs 98 through flexible conduits 99.

FIG. 7 illustrates an end view of a structure forming apparatus 101 straddling a narrow ditch 102 with banks 104 as a continuous structure 103 is positioned longitudinally along the ditch.

The liquid reactive resin forming material employed to produce structures of the invention is selected to be capable of reaction to form the particular resin matrix desired in the final structure. Advantageously, the resin matrix is a thermosetting resin such as a polyurethane or polyester. Should a polyurethane be desired, one reservoir may contain an isocyanate and another reservoir may contain a polyol. More commonly, the reservoirs may contain different partially formed materials which upon mixing interact to form the desired polyurethane. Examples of such partially formed materials include so-called "A stage" resins and "B stage" resins.

Other resin forming systems may utilize a resin forming material in one reservoir and a catalyst in a second reservoir. Additional components can be premixed with one of the resin formers, e.g. fillers, reinforcements, colors and the like.

The particulate solid additive material is mixed with the liquid reactive resin forming material substantially continuously in a proportion significantly greater than that of the resin forming material. The additive particles may be any of a wide variety of inexpensive materials readily available at a particular job site. Natural mineral particulate materials such as sand and gravel normally are available or can be produced simply by crushing rock at the site.

Also, materials such as waste or recycled materials which can be shredded or ground into particles of suitable size can be utilized. Particularly useful are particles formed by shredding or grinding discarded tires. Since the particles are encapsulated with the resin forming material and not saturated therewith, many different waste materials may be employed.

Suitable porous blankets include woven, knit, nonwoven structures, etc. The blankets e.g. fabrics, mats, etc. may be formed of continuous or discontinuous fibers, yarns, slit ribbons and similar natural and synthetic fibrous materials. Reinforcing members such as ropes, cables and the like that extend longitudinally and/or transversely of the blanket centerline may be included if desired.

The above description and the accompanying drawings show that the present invention provides a novel method, apparatus and structure which overcome the shortcomings of previous expedients and in addition, provide features and advantages not found in earlier technology.

The structure produced with the method and apparatus of the invention can include major proportions of recycled, waste or other materials which are readily available at a job site. These structures are of high quality and may exhibit properties not usually found in products formed with conventional ingredients.

The method of the invention may be conducted by individuals with only limited mechanical skills and experience to produce high quality structures safely and efficiently. The method can be modified to form a variety of different structures. Variations in configuration, composition, physical dimensions and surface appearance, etc. can be achieved easily. Even with such changes, uniformity and high quality can be maintained without difficulty.

It will be apparent that various modifications can be made in the particular method, apparatus and structure described in detail above and shown in the drawings within the scope of the present invention. The method steps, apparatus components and types of materials employed can be changed to meet specific process and structural requirements. For example, the number and disposition of porous blankets and patterns can be different. These and other changes can be made in the method, apparatus and structure of the invention provided the functioning and operation thereof are not adversely affected. Therefore, the scope of the present invention is to be limited only by the following claims.

What is claimed is:

1. A method of forming a continuous structure including the steps of preselecting a liquid reactive resin forming material, an additive solid particle material and a porous blanket, mixing said additive with said liquid resin forming material substantially continuously in a proportion significantly greater than that of said liquid resin forming material, encapsulating substantially all of said additive particles with said liquid resin forming material to a preselected thickness, forming a pool of the mixture on said blanket, advancing said blanket at a rate sufficient to create movement of said additive particles within said pool and maintain said additive particles in suspension, migrating part of said liquid resin forming material through said blanket substantially uniformly prior to gelling of said liquid resin forming material to form a continuous resin matrix within said blanket.

2. A method of forming a continuous structure according to claim 1 including the step of confining said pool of said mixture on said blanket by positioning an elongated barrier close to said blanket and substantially transverse to a direction of blanket advance.

3. A method of forming a continuous structure according to claim 2 including the step of applying pressure to said blanket after it passes said barrier.

4. A method of forming a continuous structure according to claim 3 wherein said pressure is applied simultaneously across an entire width of said blanket.

5. A method of forming a continuous structure according to claim 4 including the step of forming a preselected pattern on a surface of said blanket while applying pressure thereto.

6. A method of forming a continuous structure according to claim 5 wherein said pattern is formed along an extended length of said blanket.

7. A method of forming a continuous structure according to claim 5 wherein said pressure is applied to said blanket for an extended period of time.

8. A method of forming a continuous structure according to claim 1 wherein said additive particles are mixed with said liquid resin forming material as it passes continuously through an elongated mixing chamber.

9. A method of forming a continuous structure according to claim 1 wherein said mixture is deposited on said blanket in a reciprocating motion across a width of said blanket.

10. A method of forming a continuous structure according to claim 2 including the step of disposing a plastic film between said barrier and said mixture.

11. A method of forming a continuous structure according to claim 10 wherein said plastic film continuously moves past said barrier.

12. A method of forming a continuous structure according to claim 11 wherein said plastic film is of extended length and remains in contact with a surface of said blanket.

13. A method of forming a continuous structure according to claim 12 wherein said plastic film is perforated.

* * * * *